C3832 RE 23,168 SEARCH ROOM

Reissued Nov. 15, 1949 Re. 23,168

UNITED STATES PATENT OFFICE 23,168

STABILIZED PYRETHRIN INSECTICIDE

Herschel G. Smith, Wallingford, and Mark L. Hill, Boothwyn, Pa., assignors to Gulf Oil Corporation, Pittsburgh, Pa., a corporation of Pennsylvania No Drawing. Original No. 2,421,223, dated May 27, 1947, Serial No. 505,058, October 5, 1943. Application for reissue August 19, 1949, Serial No. 111,341

9 Claims. (Cl. 167—24)

This invention relates to improved insecticide compositions. More particularly, this invention relates to the production of stable pyrethrin-containing insecticidal compositions, said compositions being stabilized by a 2,4,6-tri-alkylated mono-hydroxy phenol containing at least one tertiary butyl group in the ortho position to the hydroxyl group. We have found 2,4,6-tritertiarybutyl phenol and 2,6-ditertiarybutyl-4-methyl phenol to be particularly effective when used in small quantities in the prevention of oxidation and deterioration of pyrethrin-containing insecticides when used either alone or in conjunction with other toxicants, all as more fully hereinafter described.

In particular, this invention relates to stabilized liquid insecticide, acaricide, or fungicide compositions containing toxicants and/or synergists comprising a solution of pyrethrin in a suitable organic solvent such as kerosene or some other suitable hydrocarbon oil, which may also have incorporated therein such compounds as rotenone, nicotine, deguelin, toxicarol, tephrosin, sesame oil, ethylene glycol ether of pinene, n-undecylenamide, thiocyano acetate esters of terpenes such as thiocyanoacetate esters of borneol and thiocyanoacetate esters of fenchyl alcohol, beta butoxy-beta'thiocyanodiethyl ether, beta thiocyanoethyl esters of aliphatic fatty acids, and other thiocyano insecticide compounds, stabilized with a small amount of a tri-alkylated monohydroxy phenol containing at least one tertiary alkyl group, sufficient stabilizer being present to protect the insecticide against deterioration and loss of potency, particularly when exposed to light. These improved liquid insecticide compositions are useful as insecticidal sprays, particularly for use against ordinary house-flies, mosquitoes, moths, mites, roaches, ants, bedbugs and the like. Moreover, these stabilized compositions retain their toxicity toward insects over a period of time and do not lose their killing efficiency as shown by various tests.

In addition to being highly toxic to insect life, our improved insecticide compositions are stable to light and may be packaged and stored in glass or other transparent containers. Even after long storage, they do not lose their potency. It is well known to the art that pyrethrin-containing hydrocarbon solvent insecticides are not stable to oxidation and the effects of normal daylight. It is also known that this instability tendency is augmented when the pyrethrins are used in conjunction with certain other toxicants and synergetic compounds.

Other toxicants which may be included in our stabilized pyrethrin-containing insecticides are those derived from fish-poison plants. Rotenone and related substances, the active principles of the fish-poison insecticides, are, like pyrethrum, relatively harmless to warm-blooded animals, and at the same time are efficient insecticides. At least four genera of plants are known to be used as fish-poisons, and certain species of the following have been found to have insecticidal properties: Derris, derived from the tuba plant; Lonchocarpus, a genus of tropical leguminous trees and shrubs; Tephrosia, derived from herbaceous plants and shrubs; and Mundulea, derived from certain shrubs.

Besides the insecticides derived from natural plants, shrubs, seeds and the like, certain organic compounds are being used more and more as effective insecticide toxicants. These, too, may be incorporated in our stabilized pyrethrin-containing insecticides. Among these are the aliphatic thiocyanates which are advantageously substituted with one or more negative elements such as oxygen, sulphur, iodine or other negative elements or groups in the organic radical attached to the thiocyanate group. Examples of the compounds which may be used in conjunction with our invention are thiocyano acetone, amyl thiocyanacetate and cyclohexyl thiocyanoacetate. Also among the compounds suitable for use in conjunction with pyrethrum in our stabilized pyrethrin-containing insecticides are methyl thiocyanoacetate, amyl-beta-thiocyanopropionate, diethyl thiocyanomalonate, ethylene dithiocyanate, para-thiocyanobenzyl-aniline, 2-4-dinitrothiocyano benzene and other compounds of a similar nature.

Pyrethrin-containing insecticidal compositions may have other organic compounds dissolved therein as effective insecticidal agents such as lauryl thiocyanate, xanthates, thiuram sulfides, trimethylamine, benzyl-pyridine, n,n-amyl-acetyl cyclohexylamine, n,n-amyl-benzoyl cyclo-hexylamine, other n-heterocyclic amines, etc. All of the above-mentioned organic compounds are effective, to some degree, when used in conjunction with pyrethrin-containing insecticidal compositions. Moreover, in certain instances, synergic action has been shown.

Synergists, materials which may or may not be toxic in themselves, have considerable commercial value. For instance, isobutyl undecylenamide, sesame oil and ethylene glycol ether of pinene have been used commercially to increase the insecticidal value of pyrethrins dissolved in kerosene or a light hydrocarbon oil. The exact mechanism of these synergists is not fully known, but their effect in numerous tests have established the value of this type of material in insecticides, fungicides and the like. However, we have found that many of these mixtures of insecticidal compositions containing pyrethrins either alone or including some of the other toxicants or synergists mentioned above undergo decomposition when exposed to light and air.

It is well known to the art that pyrethrin solutions decompose when exposed to light or to long time aging. This is true more or less of most of the currently used insecticides. It is also well known that certain insecticides comprising pyrethrins and thiocyanoacetate esters of terpenes are incompatible and deteriorate readily. Certain chemicals have been used in insecticides to increase the insecticidal action of pyrethrin sprays, such as fenchyl thiocyanoacetate, which react with the pyrethrins with resultant loss of toxicity in the insecticide mixture. We have found that such deterioration and loss of insect killing efficiency can be lessened when minor proportions of tri-alkylated phenols containing at least one tertiary alkyl group are incorporated in the pyrethrin-containing insecticidal compositions. Moreover, these trialkylated phenols act as a solvent to help keep the toxicant materials in solution.

In the manufacture of insecticide sprays, the active insecticides such as pyrethrins and perhaps other toxicants are usually dissolved in suitable hydrocarbon oil bases or other organic solvents in the desired concentration. In fact, solutions of pyrethrins dissolved in petroleum fractions have long been known and used as insecticides. Such solutions are conventionally prepared by extracting pyrethrin flowers with several times their weight of petroleum naphtha or kerosene to extract the pyrethrins; and the extract so obtained is diluted with kerosene to obtain various commercial preparations useful as insecticidal sprays suitable against ordinary house flies and other household pests, such sprays being highly toxic to insect life and non-toxic to human beings and to ordinary domestic animals.

We have found that these pyrethrin-containing sprays, when used either alone or in conjunction with the numerous above-mentioned fish-poisons or organic toxicant compounds, can be stabilized against deterioration and loss of potency, particularly when exposed to light, by incorporating therein a small quantity of a tri-alkylated monohydroxy phenol containing at least one tertiary alkyl group; 2,4,6-tri-tertiary-butyl-phenol and 2,6-ditertiarybutyl-4-methyl phenol being particularly effective. The tri-alkylated monohydroxy phenols containing at least one tertiary group may be represented by the following structural formula:

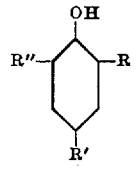

wherein R, R' and R'' represent alkyl groups, at least one of the tertiary alkyl groups containing four or more carbon atoms. In the class of compounds set forth in which the 2-, 4- and 6-positions may be occupied by substituted alkyl groups, the original OH group of the phenol is considered as being in the 1-position.

The phenolic compounds coming within the class of alkali-insoluble alkylated phenols are best represented by the compound 2,4,6-tritertiarybutyl phenol. Likewise, 2,6-ditertiarybutyl-4-methyl phenol is particularly effective in our pyrethrin-containing insecticidal solutions. While the foregoing examples represent what are perhaps the most effective members of the series, the substances comprehended as coming within this class may be defined in general as the 2,4,6-tri-alkylated monohydroxy phenols having a total of four or more carbon atoms in the alkyl groups ortho to the hydroxyl group. These compounds fall in the general classes disclosed in U. S. Patent 2,202,877 and related patents. The insolubility of these compounds in alkalies probably has to do with the "ortho effect," probably a form of steric hindrance; in any event these compounds are incapable of forming metallic derivatives by ordinary means. Therefore, they can also be combined with soap containing solutions such as are sometimes used in insecticides without changing the nature of the composition insofar as the molecular structure of the alkylated monohydroxy phenols are concerned.

Commercial preparations of 2,4,6-tritertiary-alkyl phenol are manufactured under specifications of U. S. Patent No. 2,149,759 issued to T. L. Cantrell. This compound normally has the following properties:

| | |
|---|---|
| Molecular weight | 262.24 |
| Specific gravity, 260°, 60° F | 0.834–0.854 |
| Melting point, °F | 206–250 |
| Boiling point, °F., 40 mm. Hg pressure | 350 (50% Point) |

It is well known that insecticides which are prepared by dissolving small proportions of one or more of the toxicants named ante in a major proportion of kerosene type distillate lose some of their potency upon aging or exposure to light. We have found that the addition of a small quantity of 2,4,6-tritertiary-butyl phenol added to the insecticides decreases such tendency to deteriorate and produces a definite improvement to household insecticides or hydrocarbon solutions of insecticide toxicants, such as have been named ante.

The following examples illustrate the stabilizing action of our tri-alkylated phenols, having at least one tertiary alkyl group, when minor amounts are incorporated in pyrethrin-containing insecticides. A pyrethrin-containing insecticide was made from the extract of 1.02 pounds of Kenya pyrethrin flowers incorporated in a gallon of refined kerosene; the inspection data of the mixture being shown as Example I.

SEARCH ROOM

*Example I*

| Make-up | Extract of 1.02 lb. Kenya pyrethrum flowers per gallon refined kerosene |
|---|---|
| Gravity, ° API | 50.0 |
| Flash, TCC, ° F | 152 |
| Color: Lovibond, 1" Cell—500 Amber Series | 26 |
| Fly Killing Test: Average Test—Killed, 24 Hr., per cent | 70 |
| Pyrethrin Content, Mg./100 Cc.: Seil Method—Total Pyrethrins | 175 |
| Distillation, Kerosene: A. S. T. M. D 86-40— | |
| Over Point: ° F | 376 |
| End Point: ° F | 488 |
| 10% at: ° F | 398 |
| 50 | 422 |
| 90 | 468 |

This same mixture of a typical commercial pyrethrin-containing insecticide then had incorporated in it 0.05 per cent by weight of 2,4,6-tri-tertiary-butyl phenol. The incorporation of this stabilizing agent did not affect the properties of the old insecticide is shown by comparing the physical properties shown in Example I with the improved insecticide shown as Example II below.

*Example II*

| Make-up | Extract of 1.02 lb. Kenya pyrethrum flowers per gallon of refined kerosene containing 0.05 per cent by weight 2, 4,6-tritertiarybutylphenol |
|---|---|
| Gravity, ° API | 50.0 |
| Flash, TCC, ° F | 152 |
| Color: Lovibond, 1" Cell—500 Amber Series | 26 |
| Fly Killing Test: Average Tests—Killed, 24 Hr., per cent | 70 |
| Pyrethrin Content, Mg./100 Cc.: Seil Method—Total Pyrethrins | 175 |
| Distillation, Kerosene: A. S. T. M. D 86-40— | |
| Over Point, ° F | 374 |
| End Point, ° F | 490 |
| 10% at: ° F | 388 |
| 50 | 420 |
| 90 | 468 |

Insecticides of Example I and II were exposed to ultra-violet light for two hours and then were tested by our fly killing test described more fully hereinbelow. Table I shows the advantages of our stabilizing agent when incorporated in pyrethrin-containing insecticides.

*Table I*

| Example | I | II |
|---|---|---|
| Tests after Exposure to Ultra Violet Light for 2 hrs.: Fly Killing Tests—Average Tests—Killed, 24 hrs., per cent | 36 | 68 |

The following examples show the physical properties of a number of insecticidal compositions consisting of mixtures of pyrethrin-containing insecticidal toxicants and other natural or organic toxicants stabilized with a small proportion of trialkylated mono-hydroxy phenol. Insecticides containing mixtures of pyrethrins and beta thiocyanoacetate esters of terpenes in kerosene are likewise stabilized against deterioration and loss of killing effectiveness as is shown by the data below. Beta thiocyanoesters of terpenes have proven to be an effective toxicant for insect sprays and the like. A typical sample of these esters had the following properties:

| | |
|---|---|
| Gravity, °Bé. (80° F.) | 12.1 |
| Viscosity, SUV, 100° F | 86.0 |
| Flash, TCC, °F | Above 194 |
| Acid heat, °F | 338 |
| Pour, °F | −40 |
| Color, NPA | 5.5 |
| Iodine No., Mod. Hanus | 10.4 |
| Neutralization No | 5.0 |

These beta thiocyanoesters of terpenes were incorporated in an insect spray according to the following data:

*Table II*

| Example | III | IV |
|---|---|---|
| Description | Uninhibited. | Inhibited. |
| Make-up: | | |
| Beta thiocyanoesters of terpenes, per cent by Wt. | 0.88 | 0.88 |
| Pyrethrins, Mg./100 Cc | 87 | 87 |
| 2,4,6-tritertiarybutyl phenol, per cent by Wt. | | 0.05 |
| Refined Kerosene to Make | 100% | 100% |
| Inspection: | | |
| Gravity, ° API | 49.3 | 49.3 |
| Color—Lovibond, 1" Cell—500 Amber Series. | 24 | 24 |
| Fly Killing Test—Average Tests—Killed, 24 Hrs., per cent. | 75 | 77 |
| Tests after exposure to Ultra-Violet Light for 2 hrs.—Fly Killing Test—Average Tests—Killed, 24 hrs., per cent. | 19 | 75 |
| Tests after exposure to Ultra-Violet Light for 6 hrs.—Fly Killing Test—Average Tests—Killed, 24 Hrs., per cent. | 8 | 65 |

Insecticides containing mixtures of pyrethrins, beta thiocyanoacetate esters of terpenes, beta-butoxy-beta' thiocyanodiethyl ether and beta thiocyanoesters of higher fatty acids in kerosene are also affected by our stabilizing agent:

*Table III*

| Example | V | VI | VII | VIII |
|---|---|---|---|---|
| Description | Uninhibited. | Inhibited. | Uninhibited. | Inhibited. |
| Make-up: | | | | |
| Pyrethrins, Mg./100 Cc | 80 | 80 | 60 | 60 |
| Beta thiocyanoesters of terpenes: Per cent Vol. | 0.50 | 0.50 | 0.50 | 0.50 |
| Beta butoxyl beta' thiocyanodiethyl ether: Per cent by Vol. | 0.125 | 0.125 | 0.125 | 0.125 |
| Beta thiocyanoesters of higher fatty acids, per cent by Vol. | 0.375 | 0.375 | 0.375 | 0.375 |
| 2, 4, 6-tritertiarybutylphenol, per cent by Wt. | | 0.05 | | 0.05 |
| Methyl Salicylate, per cent by Vol. | 0.05 | 0.05 | 0.05 | 0.05 |
| Refined Kerosene to Make | 100% | 100% | 100% | 100% |
| Inspection: | | | | |
| Gravity, ° API | 49.0 | 49.0 | 49.2 | 49.2 |
| Color—Lovibond, 1" Cell—500 Amber Series. | 12 | 12 | 9 | 9 |
| Fly Killing Tests—Average Tests—Killed, 24 hrs., per cent. | 72 | 72 | 74 | 74 |
| Tests after exposure to Ultra-Violet Light for 2 hrs.—Fly Killing Tests—Average Tests—Killed, 24 hrs., per cent. | 46 | 72 | 51 | 70 |

The insecticide or ~~livestock~~ sprays set forth in the above examples were tested by our special test described hereinbelow. In particular the sprays set forth in Examples II, IV, VI and VIII showed marked improvement in insect killing potency when exposed to ultra-violet light over a period of time when compared to the uninhibited mixtures. In each case the spray oils prepared in accordance with our invention showed excellent insect killing potency when exposed to air and light over a period of time, as is shown by our special fly killing test results.

The fly killing test referred to in the above examples is a special one which we have worked out and which affords especially accurate and reproduceable results for testing insect sprays, livestock sprays and the like. This test, which is described more fully hereinbelow, was devised by us several years ago and is now referred to as Gulf Method No. 223.

First, in order to test flies, healthy flies have to be available. If flies are caught in the open they are of various ages and health and cannot be used in a standardized test. Therefore, we have devised a fly raising cage containing feeding pans comprising one 4-in. aluminum dish filled with Richardson's ovipositor medium and one 150 mm. dish, the bottom of which is covered with bread wet with milk containing 40 cc. of yeast suspension per quart.

Richardson's ovipositor medium consists of the following mixture:

| | |
|---|---|
| Wheat bran, g | 1,500 |
| Alfalfa meal, g | 300 |
| Water, cc | 5,000 |
| Diamalt (Standard Brands, Inc.), cc | 25 |
| Yeast suspension (2000 cc. water containing 454 g. of bakers' yeast), cc | 300 |

After wild flies have fed two days, the beaker containing the ovipositor medium was removed and a portion of the contents was scattered on the top of fresh medium contained in a battery jar. The jar was not overcrowded when the flies emerged. The battery jar was covered with cheese cloth held in place by a rubber band. The flies emerging daily were placed in separate stock cages containing bread wet with milk and yeast suspension. To keep a uniform population, proportionate quantities of flies from each cage emerging daily were composited. The supply of bread wet with milk and yeast suspension was renewed in each cage daily. When the newly-raised flies were five days old they were ready for testing.

The killing or testing chamber comprised an inverted bell jar, the bottom of which had been removed. An atomizer was placed in the top of the bell jar to produce a spray comprising droplets of substantially 5 to 10 microns in diameter, as measured on a smoked slide. A nozzle 0.005 to 0.008 in. in diameter was found to give satisfactory results, delivering 0.15 to 0.25 cc. in 5 seconds and giving a kill of 68–72 per cent with standard 70 solution.

The standard 70 solution which we used is insecticide naphtha containing 2.5 per cent by volume of beta butoxy beta' thiocyanodiethyl ether (U. S. Patent No. 1,808,893). The standard 70 solution was added in such quantity as was required to give a 70 per cent corrected kill. The nitrogen content for this standard 70 solution was usually 0.17 to 0.18 gram per 100 cc. Another official test insecticide was obtained from the secretary of the National Association of Insecticide and Disinfectant Manufacturers, Inc., New York city, for comparisons based on the N. A. I. D. M. rating system.

The insecticide naphtha used in the above standard solution was a special naphtha prepared to meet the following specifications:

| | |
|---|---|
| Gravity, °API | 49.0–51.0 |
| Flash, TCC, °F | 145–155 |
| Color, Saybolt | Not darker than +25 |
| Doctor | Good |
| Odor | Very slight petroleum |
| Flock test. method 130.1 Gov't | OK |
| Copper strip test, 122° F., 3 hrs. | Must pass |
| Neutralization No | Nil |
| Iodine No., Mod. Hanus | Max. 1.0 |
| Distillation gasoline: | |
| A. S. T. M. 86–40— | |
| Over point, °F | 365–383 |
| End point, °F | 482–500 |
| 10% at: °F | 383–401 |
| 50 | 419–428 |
| 90 | 455–473 |

The following procedure was used in testing the various insecticides. All tests were made at 80–90° F. and 50–70 per cent relative humidity. Three preliminary tests were made on each batch of flies: (1) with insecticide naphtha, following the procedure for insecticides given below; (2) for mortality in 24 hrs.; and (3) for starvation in 24 hrs. A batch was rejected if the test resulted in more than 6 per cent killed or 20 per cent down; if the mortality in 24 hrs. exceeded 5 per cent; or if death by starvation was less than 50 per cent.

Exactly 100 flies were placed in the killing chamber comprising an inverted bell jar, the bottom of which had been cut off evenly. The chamber was placed on brown paper on a flat surface so that the bottom was completely covered with the brown paper. Then the atomizer was connected to the air line and the pressure adjusted to 12.5 lbs. per sq. in. and the atomizer was then attached to the killing chamber. Then a predetermined quantity of the insecticide to be tested was placed in the reservoir of the atomizer. This quantity was the amount necessary to give a 68–72 per cent kill with the particular atomizer when the standard 70 solution was used as the killing agent. This quantity was usually within the limit of 0.15–0.25 cc.

The insecticide was then sprayed for 15 seconds for kerosene base sprays and 30 seconds for livestock sprays, then the atomizer was removed and the opening in the top was closed with a glass cover. Everything was left in position for 10 minutes. Then the chamber was removed and the number of flies down were counted. Flies were considered down if they did not show appreciable movement in 30 seconds. The flies knocked down were placed in an observation cage in which a glass dish, 1.5 in. in diameter and 1 in. high, was placed; the dish contained a wad of cotton wet with a concentrated sugar solution. The temperature and relative humidity were recorded. At the end of 24 hours the number of dead and moribund flies were counted and recorded.

This test was repeated until at least ten separate tests had been made using approximately 1000 individual flies taken from at least three separate batches. Each of these batches of flies was tested against the standard 70 solution to correct the per cent dead, observed when testing the insecticide, to a normal kill for the standard

SEARCH ROOM 70 solution. After these ten tests were made, an average was taken, after correcting each one against the standard 70 solution.

When the value of the beta butoxy beta' thiocyanodiethyl ether solution used in preparing the standard 70 solution is known, it was corrected to that value; otherwise the factor of 70 per cent kill as a normal value was used. For example, if the value observed was 66 per cent kill for the standard 70 solution, and 68 per cent for the insecticide in question, the per cent killed=

$$\frac{70}{66}\times 68=72$$

and was recorded as 72 per cent killed.

This test gave especially accurate results with the saving of considerable time and has proved to be much simpler and more reliable than the widely used Peet-Grady method. We do not intend to limit ourselves to the specific compounds tested according to our testing procedure, the specific details being given for clearness and understanding only.

What we claim is:

1. As improved, stable pyrethrin-containing insecticides, stabilized against deterioration by light, the improved insecticide compositions comprising a pyrethrum extract in a hydrocarbon solvent containing a minor amount of a 2,4,6-trialkylated monohydroxy phenol having the following formula

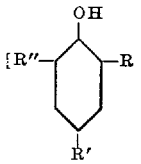

wherein R and R'' represent tertiary butyl groups and R' represents an alkyl group selected from the class consisting of methyl and tertiary butyl groups, the amount of said tri-alkylated phenol being sufficient to stabilize the pyrethrin-containing insecticide against deterioration by light and air and to inhibit loss of insect killing efficiency when exposed to light and air.

2. The improved light-stable pyrethrin-containing insecticides of claim 1 wherein the amount of said tri-alkylated phenol is from 0.001 to 1.0 per cent by weight of the composition.

3. The improved light-stable pyrethrin-containing insecticides of claim 1 wherein the said tri-alkylated phenol is 2,4,6-tritertiarybutyl phenol.

4. The improved light-stable pyrethrin-containing insecticides of claim 1 wherein the said tri-alkylated phenol is 2,6-ditertiarybutyl 4-methyl phenol.

5. As improved, stable pyrethrin-containing insecticides, stabilized against deterioration by light, the improved, light-stable insecticide compositions comprising a pyrethrum extract in a hydrocarbon solvent containing from 0.001 to 1.0 per cent by weight of 2,4,6-tritertiarybutyl phenol, the amount of said tri-alkylated phenol being sufficient to stabilize the pyrethrin-containing insecticides against deterioration by light and air and to inhibit loss of insect killing efficiency when exposed to light and air.

6. As improved, stable pyrethrin-containing insecticides, stabilized against deterioration by light, the improved light-stable insecticide compositions comprising a pyrethrum extract in a hydrocarbon solvent containing from 0.001 to 1.0 per cent by weight of 2,6-ditertiarybutyl-4-methylphenol, the amount of said tri-alkylated phenol being sufficient to stabilize the pyrethrin-containing insecticides against deterioration by light and air and to inhibit loss of insect killing efficiency when exposed to light and air.

7. An improved method of stabilizing pyrethrin-containing insecticides against deterioration by light and air and loss of insect killing efficiency when exposed to light and air, which comprises incorporating in the pyrethrin-containing insecticides from 0.001 to 1.0 per cent by weight of a 2,4,6-tri-alkylated monohydroxy phenol having the formula

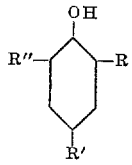

wherein R and R'' represent tertiary butyl groups and R' represents an alkyl group selected from the class consisting of methyl and tertiary butyl groups, the amount of said tri-alkylated phenol being sufficient to stabilize the pyrethrin-containing insecticide against deterioration by light and air and to inhibit loss of insect killing efficiency when exposed to light and air.

8. The improved method of claim 7 wherein said tri-alkylated phenol is 2,4,6-tritertiarybutyl phenol.

9. The improved method of claim 7 wherein said tri-alkylated phenol is 2,6-ditertiarybutyl-4-methyl phenol.

HERSCHEL G. SMITH.
MARK L. HILL.

No references cited.